(12) United States Patent
Bridge et al.

(10) Patent No.: US 7,016,024 B2
(45) Date of Patent: Mar. 21, 2006

(54) ACCURACY AUTOMATED OPTICAL TIME DOMAIN REFLECTOMETRY OPTICAL RETURN LOSS MEASUREMENTS USING A "SMART" TEST FIBER MODULE

(75) Inventors: Gary D. Bridge, Oriskany Falls, NY (US); Gregory Soule, Clinton, NY (US)

(73) Assignee: Net Test (New York) Inc., Utica, NY (US)

( * ) Notice: Subject to any disclaimer, the term of this patent is extended or adjusted under 35 U.S.C. 154(b) by 22 days.

(21) Appl. No.: 10/847,790

(22) Filed: May 18, 2004

(65) Prior Publication Data
US 2005/0259242 A1   Nov. 24, 2005

(51) Int. Cl.
*G01N 21/00* (2006.01)
(52) U.S. Cl. .................................................. 356/73.1
(58) Field of Classification Search ............... 356/73.1; 385/123–127, 31–37
See application file for complete search history.

(56) References Cited

U.S. PATENT DOCUMENTS 5,673,108 A * 9/1997 Takeuchi ................... 356/73.1
6,879,386 B1 * 4/2005 Shurgalin et al. .......... 356/73.1

* cited by examiner

*Primary Examiner*—Tu T. Nguyen
(74) *Attorney, Agent, or Firm*—Wall Marjama & Bilinski LLP

(57) ABSTRACT

The invention provides automated systems and methods for measuring ORL of fibers under test. A computer-based test instrument using OTDR tests fibers with the help of a STFM having predefined characteristics that are recorded in a machine-readable memory. The information recorded in the memory is accessible to the computer-based instrument and is used to calibrate a power level of an illumination source in real time using the reflectance response of the STFM. The calibrated illumination power allows the instrument to automatically determine the ORL of the fiber being tested with precision, and without requiring the intervention of an operator. The instrument also has the capability to automatically sense the presence of a test fiber, and to automatically attenuate the reflectance signal to remove a saturation condition by controlling at least one of the illumination, the detector gain, an amplifier gain, and an optional in-line optical attenuator.

21 Claims, 10 Drawing Sheets

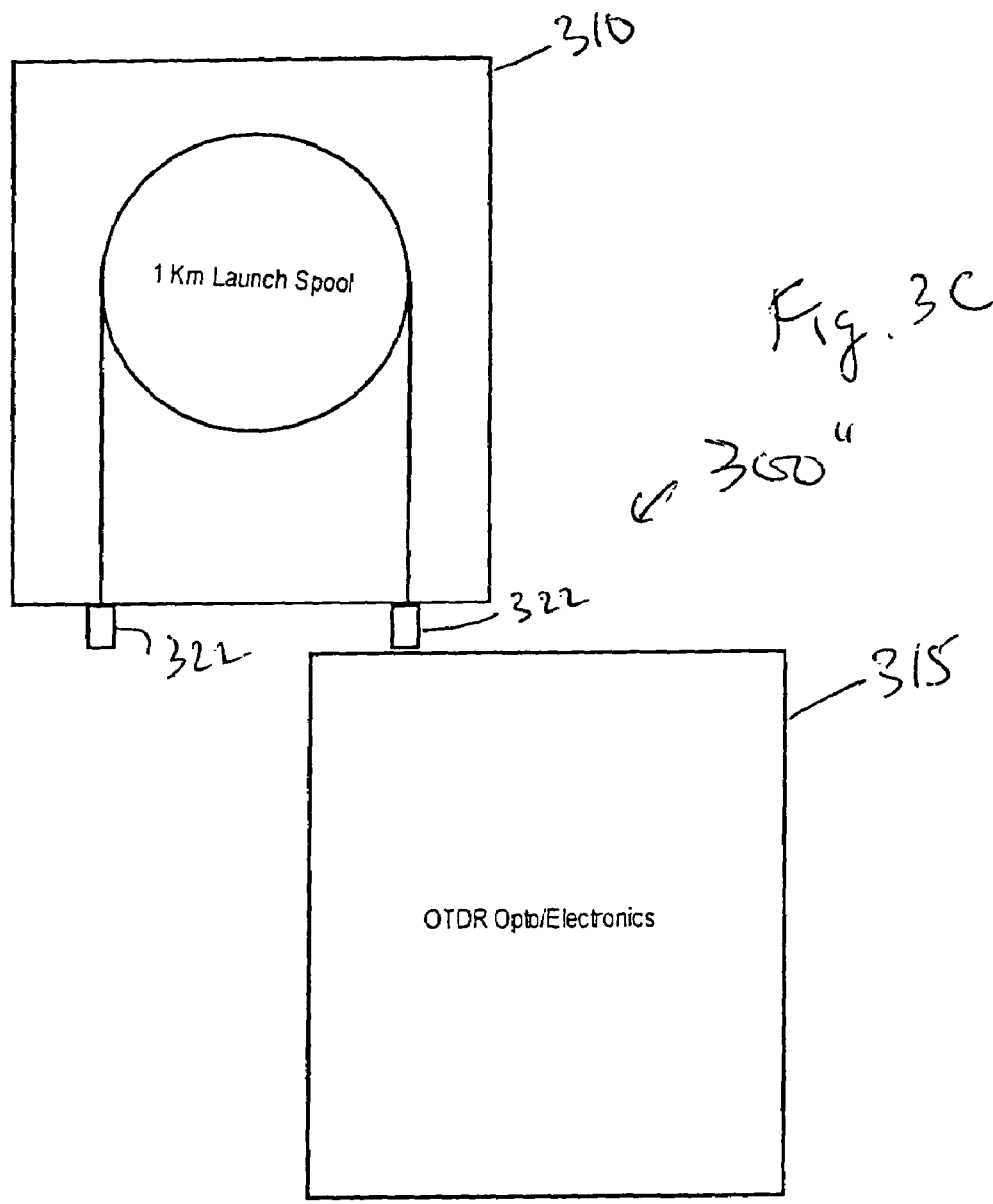

ACCURACY AUTOMATED OPTICAL TIME DOMAIN REFLECTOMETRY OPTICAL RETURN LOSS MEASUREMENTS USING A "SMART" TEST FIBER MODULE

FIELD OF THE INVENTION

The invention relates to systems and methods for determining losses in optical fiber segments in general and particularly to systems and methods for measuring such losses using a calibrated fiber segment and automated systems and methods for determining such losses.

BACKGROUND OF THE INVENTION

A widely used method of determining light attenuation in a fiber, which attenuation is observed as an Optical Return Loss (hereinafter "ORL"), utilizes an optical time domain reflectometer instrument (hereinafter "OTDR"), and the measurement process is referred to as optical time domain reflectometry (also referred to hereinafter as "OTDR"). While OTDR instruments and the OTDR method have been used for some years, there are often issues relating to the accuracy of measurements made by inexperienced users. The calibration of OTDR instruments is known, as described for example in the 23 page document entitled "Calibration of Optical Time-Domain Reflectometers," published by the International Electrotechnical Commission (hereinafter "IEC") and identified by the designation "IEC TC 86/WG4/SWG2 (Bouquain)5" (hereinafter "IEC TC 86") and dated 28 Jun. 1999, the disclosure of which is incorporated herein by reference in its entirety. The document refers to such parameters as the backscatter parameter K [in units of seconds$^{-1}$] and the backscatter coefficient C=K×ΔT, where ΔT is the pulse width of an illumination pulse, measured in units of time (e.g., seconds), and C is a pure number. Annex F of the IEC TC 86 discusses OTDR measurements and backscatter theory as applied to a continuous wave (CW) source. The document also describes methods of calibrating the reflectance of a fiber, for example, at Section 8 and Annex E of the document. As is clear from reviewing this document, the process of measuring the properties of an optical fiber is demanding and requires care and precision for a successful outcome.

Optical return loss (ORL) can cause problems in Dense Wave Division Multiplex (DWDM) and other high-speed optical transmission systems used in communication networks. ORL can affect system performance by causing higher Bit Error Rates (BER) at a receiver and by causing transmitter damage if the output power requirements are unstable.

There is a need for OTDR instrumentation and methods that make possible highly accurate measurements on optical fibers under real world conditions even in the hands of inexperienced, or inexpert, users, such as field installers of optical fiber systems.

SUMMARY OF THE INVENTION

According to principles of the invention, fully automated OTDR ORL systems and methods are provided that automate all trace collection parameters, and remove sources of error from the measurement. The systems and methods include the use of a Smart Test Fiber Module, and an automated ORL Software Application.

The systems and methods of the invention use a Smart Test Fiber Module (hereinafter "STFM") as a lead fiber to all ORL measurements. The STFM is characterized at at least one wavelength of 1244, 1310, 1410, 1480, 1550, and 1625 nm for fiber length and attenuation coefficient, and is calibrated for the backscatter coefficient. An ORL incident power calculation is performed under the control of software. The presence of a lead fiber of known characteristics and length provides an area on the test fiber module in the ORL that yields the necessary data to perform the incident power calculation for the ORL measurement. In a preferred embodiment, the starting location of the measurement can be automatically set to the distal end of the STFM.

The systems and methods of the invention use application software to fully automate the OTDR trace collection and calculation of the ORL for the fiber under test. The application software provides a real time connection check at the connection of the STFM to the fiber under test. The application software automatically sets the distance range and data point resolution to optimum settings for ORL measurements. The application software automatically sets the pulse with to a 5 µs (microsecond) high resolution value to allow for optimum trace feature amplitude measurements. The application software automatically measures the trace to detect saturation events, and controls laser power, APD bias voltage, amplifier gain, and an option in-line optical attenuator to attenuate the OTDR trace to bring all reflective events out of saturation as required. The application software automatically and dynamically changes averaging time based on the signal to noise ratio of the backscatter signal on the trace section in the test fiber module. The application software automatically halts the measurement when a satisfactory signal-to-noise (S/N) ration is attained. The application software uses prerecorded information stored in memory in the STFM in addition to the value of the parameters that the software sets to make an ORL calculation for the fiber connected to the output of the STFM.

The technology for launching illumination into optical fibers and for receiving and detecting illumination transported by optical fibers is well known and is performed daily on millions of optical fibers that carry information bi-directionally all over the world. See for example U.S. Pat. No. 4,700,339 issued on Oct. 13, 1987 to Gordon et al. the entire disclosure of which is incorporated herein by reference. That technology will not be discussed herein at length because it is known to practitioners of ordinary skill in the fiber optic communication arts.

The ORL measurement instrument and the method of operation thereof as described herein comprise many interactive features for use by an operator. However, in some embodiments, the ORL measurement instrument is a one button, automated test instrument that presents no OTDR traces to the operator, for example in an inexpensive, portable instrument intended for field use in testing optical fiber. Such an instrument intended for field use, for example by an installer or a repair technician, need only report whether a particular test is valid, and if so, whether a particular optical fiber passed or failed the test. For such a field use instrument embodying principles of the invention, a minimum amount of input information and a minimum amount of output data is all that is required to successfully test optical fiber. By way of example, a suitable range of ORL for a given length of fiber may be recorded in a data file accessible to the software operating the apparatus and controlling the test. If the instrument detects an ORL falling within the acceptable range, the instrument need only report a valid test, and a positive outcome for the fiber being tested, for example by illuminating a single visible output such as a green LED. The instrument could, for example, use a yellow LED to indicate a possibly faulty test, and a red LED to indicate an optical fiber that failed the test. Alternatively, the instrument could report audibly, using one, two, or three beeps, respectively.

In one aspect, the invention relates to an apparatus for performing automated optical time domain reflectometry optical return loss measurements on an optical fiber under test. The apparatus comprises an illumination module having a controllable illumination source that provides illumination controllable in intensity with respect to time at a predefined wavelength; a radiation detection module having an electromagnetic radiation detector and an amplifier, the electromagnetic radiation detector responsive to the illumination provided by the illumination source and configured to generate a signal representative of the detected illumination; a first control module in communication with and configured to control the illumination module; a second control module in communication with and configured to control the radiation detection module; an analysis module in bi-directional communication with the first and second control modules and in communication with the radiation detection module, and configured to analyze characteristics of the signal representative of the detected illumination; and a launch optical fiber module having at least one predefined characteristic, the launch optical fiber module having a first end configured to receive illumination from the illumination module, and configured to return reflected illumination to the radiation detection module, and a second end configured to be connected to an optical fiber under test. The respective first and second control modules and the analysis module cooperate to control at least a selected one of the illumination provided by the illumination module and a response of the radiation detection module, thereby automatically to determine an optical return loss of an optical fiber under test.

In one embodiment, control of the illumination provided by the illumination module comprises control of at least one of an illumination intensity, an illumination start time, and an illumination duration. In one embodiment, the radiation detection module comprises an electromagnetic radiation detector having adjustable gain. In one embodiment, the radiation detection module comprises an amplifier having adjustable gain. In one embodiment, the launch optical fiber module having at least one predefined characteristic comprises a memory in which the at least one predefined characteristic is recorded. In one embodiment, the analysis module is in communication with the memory of the launch optical fiber module having at least one predefined characteristic. In one embodiment, the first control module and the second control module are a single control module.

In another aspect, the invention features a method of performing automated optical time domain reflectometry optical return loss measurements on an optical fiber under test. The method comprises the steps of providing a launch optical fiber module having at least one predefined characteristic and having a first end and a second end; connecting the second end of the launch optical fiber module to a first end of an optical fiber under test, the optical fiber under test having a second end disposed at a length from the first end; illuminating the first end of the launch optical fiber module with applied illumination controllable in intensity with respect to time; detecting return illumination with a detector module having adjustable gain, the return illumination reflected by at least one of the launch optical fiber module and the optical fiber under test; as necessary to eliminate a saturation condition of the detector module, controlling at least one of the applied illumination and the gain of the detector module; as necessary to attain a suitable signal-to-noise ratio from the return illumination from the launch optical fiber module and the optical fiber under test, repeating the above steps of illuminating and detecting; and determining automatically from the return illumination and from the at least one of the predefined characteristic an optical return loss characteristic of the optical fiber under test.

In one embodiment, the illumination controllable with respect to time comprises controlling at least one of an illumination intensity, an illumination start time, and an illumination duration. In one embodiment, detecting return illumination with a detector module having adjustable gain comprises detecting return illumination with an electromagnetic radiation detector having adjustable gain. In one embodiment, detecting return illumination with a detector module having adjustable gain comprises using an amplifier having adjustable gain. In one embodiment, providing a launch optical fiber module having at least one predefined characteristic comprises providing the launch optical fiber module including a memory in which the at least one predefined characteristic is recorded. In one embodiment, the signal-to-noise ratio is determined using an averaging method.

In one embodiment, the method further comprises the step of determining whether the second end of the launch optical fiber module and the first end of the optical fiber under test are connected.

In yet another aspect, the invention relates to a computer program recorded on a machine-readable medium, the computer program when operating on a general purpose computer directing and controlling the performance at least one of steps (c) through (g) hereinafter enumerated of an automated optical time domain reflectometry optical return loss measurement on an optical fiber under test. The measurement comprises the steps of: (a) providing a launch optical fiber module having at least one predefined characteristic and having a first end and a second end; (b) connecting the second end of the launch optical fiber module to a first end of an optical fiber under test, the optical fiber under test having a second end disposed at a length from the first end; (c) illuminating the first end of the launch optical fiber module with applied illumination controllable in intensity with respect to time; (d) detecting return illumination with a detector module having adjustable gain, the return illumination reflected by at least one of the launch optical fiber module and the optical fiber under test; (e) as necessary to eliminate a saturation condition of the detector module, controlling at least one of the applied illumination and the gain of the detector module; (f) as necessary to attain a suitable signal-to-noise ratio from the return illumination from the launch optical fiber module and the optical fiber under test, repeating the above steps of illuminating and detecting; and (g) determining automatically from the return illumination and from the at least one of the predefined characteristic an optical return loss characteristic of the optical fiber under test.

In one embodiment, the illumination controllable with respect to time comprises controlling at least one of an illumination intensity, an illumination start time, and an illumination duration. In one embodiment, detecting return illumination with a detector module having adjustable gain comprises detecting return illumination with an electromagnetic radiation detector having adjustable gain. In one embodiment, detecting return illumination with a detector module having adjustable gain comprises using an amplifier having adjustable gain. In one embodiment, providing a launch optical fiber module having at least one predefined characteristic comprises providing the launch optical fiber module including a memory in which the at least one predefined characteristic is recorded. In one embodiment, the signal-to-noise ratio is determined using an averaging method.

In one embodiment, the computer program further comprises the step of determining whether the second end of the launch optical fiber module and the first end of the optical fiber under test are connected.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIGS. 3A, 3B and 3C are diagrams showing three illustrative embodiments of the OTDR instrument with an associated launch fiber optic module, according to principles of the invention;

DETAILED DESCRIPTION OF THE INVENTION

Figure 1:
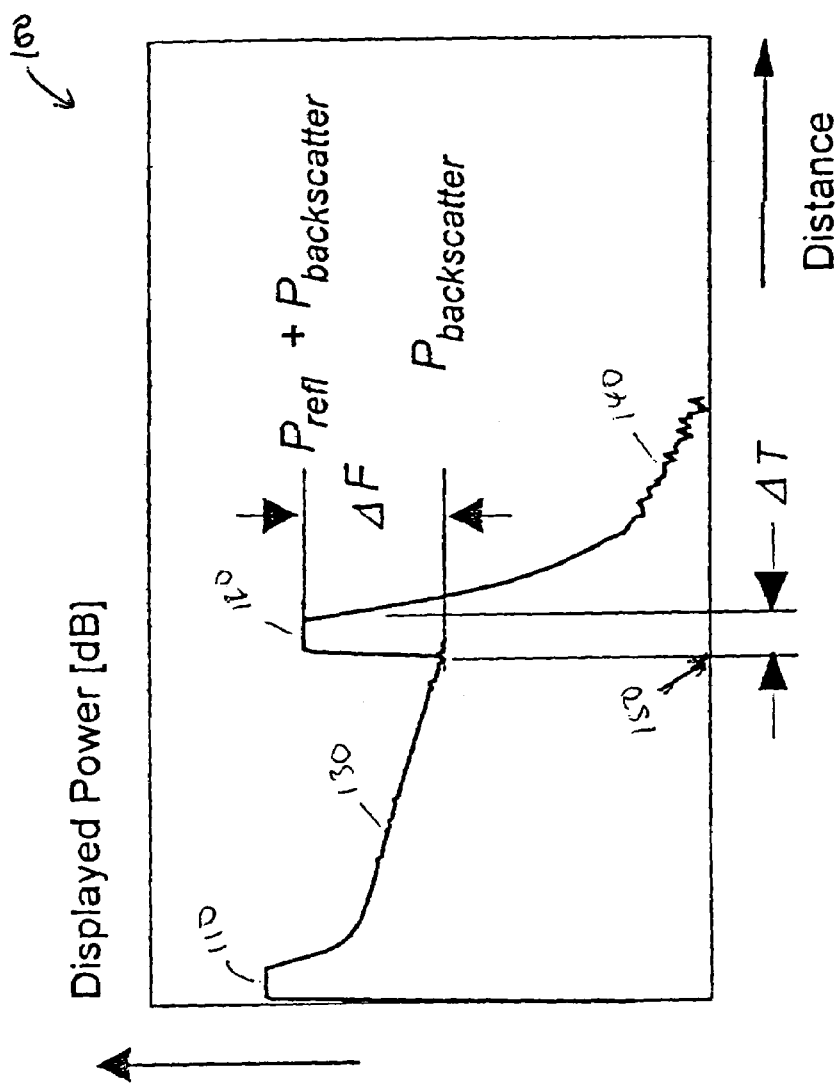
FIG. 1 is an idealized diagram that illustrates features of an OTDR measurement using prior art OTDR instruments.

Light traveling along an optical fiber becomes attenuated as it travels along the fiber. Light is attenuated by a variety of different mechanisms, including absorption by the fiber, escaping from the fiber (due to imperfections or due to excessive bending of the fiber), Rayleigh scattering, and by Fresnel reflection (which occurs when there is a sudden change in the optical index (or index of refraction) of the material through which the light is traveling. Reflectance (or Fresnel Reflection) is the term used to refer to an optical loss mechanism involving reflection that takes place at a single component, such as the end connectors on the fiber under test (hereinafter "FUT"), or any mechanical connection within the FUT. The amount of reflection at a connector, break or mechanical splice depends on a number of factors, including how clean the break is; how much the index of refraction (hereinafter "IOR") changes when the light leaves the fiber; and the connector polish. In fiber analysis, an "event" is considered to be a distinct deviation from normal fiber attenuation that may be introduced by a lossy connection (microbend, connector or splice), a reflective connection (connector or fiber break), or the end of the fiber. Optical Return Loss (ORL) is the ratio, expressed in dB, of the total reflected light, $P_r$, returning to the source through a fiber span, including loss caused by passive optical events such as connectors, couplers, splices, isolators, and Rayleigh backscatter, divided by the total light used to illuminate the fiber, $P_i$. ORL is often expressed as $$ORL = -10\log_{10}(P_r/P_i) \qquad \text{Eqn. (1)}$$

ORL is a calculated value based on optical observations (e.g., test data) that combines fiber backscatter losses and connection reflection losses as a single overall resultant loss of illumination passing through one or more optical fibers. In general, the connector interfaces have the largest effect on system ORL. In general, it is advantageous to use low reflectance connector types and to ensure high quality and clean connections are made. ORL is commonly measured in one of two ways. A first method is a direct continuous wave (hereinafter "CW") measurement, which is not the subject of the present invention, and will not be discussed further. The second is the OTDR method, which involves a measurement of the behavior of light in the optical fiber system, and a calculation to determine the ORL. The calculation comprises a numeric integration of the linear domain OTDR trace data for the fiber under test or the link under test.

Power loss or attenuation is conventionally calculated in either of two methods. A so-called "2 point attenuation correction" method simply calculates the difference of the signal level between the backscatter at a first location nearer the illumination module, and a second location farther from the illumination module. The so-called "LSA" or least squares analysis calculates a linear slope of the signal level due to backscatter over a distance of the optical fiber defined by first and second locations as above. Typically, the LSA method calculates a more accurate amount of power loss, and typically using more data points results in a better estimate.

Historically, OTDR measurements have been performed under the personal control and observation of an operator of the apparatus. The operator must manually collect a trace, identify a suitable segment of the trace for analysis, define the segment of the trace by placing an indicator at each end of the segment, and making an ORL calculation. The operator must control the apparatus to eliminate saturation events by attenuating signals. The OTDR measurement method is generally considered to be difficult to make, and always provides an answer having questionable accuracy.

An OTDR ORL calculation performed without an STFM can introduce significant inaccuracies. For example, there can be reflections in saturation. Often, inexperienced operators attempt to correct for saturation errors by employing a pulse width that is too short. The connection of a FUT directly to the illumination module can introduce a reflective loss at the connection to the FUT which is not amenable to analysis, and is ascribed to the FUT. Furthermore, the backscatter launch level in actual FUT will in general be an unknown quantity. It is possible that there will be features or events in the vicinity of areas selected for calculating the ORL.

Fully automated ORL using the ORL SW Instrument with an STFM is used to provide an accurate measurement automatically, independent of the sophistication, mathematical proficiency, or experience of the operator. Making OTDR measurements and determining ORL by calculation using a STFM provides improvements in accuracy. The OTDR software controls attenuation by controlling at least one of a radiation detection module (e.g., controlling receiver gain), comprising an electromagnetic radiation detector having adjustable gain (e.g., controlling APD bias and/or sensitivity) and an amplifier having adjustable gain (e.g., controlling amplifier gain), and by controlling a controllable illumination source that provides illumination controllable in intensity with respect to time at a predefined wavelength (e.g., laser power, pulse width and repetition rate) to eliminate saturated events. Furthermore, the STFM is calibrated and stores information, such as at least one predefined characteristic of the STFM, in a machine-readable memory, which is preferably a non-volatile memory, for example a static RAM, that is accessible to the control module of the OTDR. The one or more predefined characteristics of the STFM, such as an identifier of the STFM, a length of the STFM, and including such STFM operational values as a defined illumination wavelength, an IOR at the defined illumination wavelength, an optical length (for example in meters) at the defined illumination wavelength, an attenuation coefficient (for example in dB/km) at the defined illumination wavelength, a connector reflectivity at the defined illumination wavelength, and a backscatter coefficient at the defined illumination wavelength, are useful to calculate the ORL using the measured optical behavior of the FUT at the defined illumination wavelength. The memory of the STFM can store an identifier of the STFM and one or more such predefined characteristics, for one or more illumination wavelengths, and can be rewritten as needed. For example, the STFM when first prepared for use is measured under known calibration conditions to determine the values to be recorded in memory. After some interval of use, the STFM can be recalibrated, and if its properties have changed, new values for one or more of the predefined characteristics can be entered into memory for later use. In this way, the STFM provides a defined measurement environment, with a "safe" known measurement area for use in OTDR measurements of a FUT.

ORL measurements according to principles of the invention are performed using a singlemode OTDR module and a Smart Test Fiber Module (hereinafter "STFM") with an illumination module, one or more controller modules and an analyzer module, such as the CMA 5000 Multi-Layer Network Test Platform, available from NetTest, Inc., of 6 Rhoads Drive, Utica, N.Y. 13502. The principles of the invention are also applicable to measuring the ORL of multimode fibers. In one embodiment, the CMA5000 is equipped with a light source and power meter for end-to-end loss testing. The CMA5000 is a personal computer-based instrument that includes, in one embodiment, a full range of I/O connections (including Ethernet, USB, IrDA, PS/2, VGA, Serial, Parallel, and PC-card slots); a display having touch screen capability; non-volatile memory (including a hard disk, a CD-ROM, a CD-RW drive, and/or a floppy drive); dedicated keys providing specific functions using one button operation (including Test, Stop, File, Setup, Print, and Help); and a cursor knob with integral push button for precise location of a cursor in two dimensions on the display. Optionally, an apparatus according to the invention can include other equivalent hardware, such as a keyboard, and/or a pointing device such as a mouse, in place of or in addition to a touch screen. Other hardware that is the functional equivalent of other enumerated functions, such as a printer corresponding to a display, or other forms of memory or I/O connections, can be used in addition to, or in some embodiments, as substitutes for, the above enumerated hardware. In addition, for the convenience of the user, LEDs are provided to indicate external power, battery, and drive activity. Using instruments and methods according to principles of the invention, deadzones of less than 1 meter per reflective event, and 1–2 meters for attenuation (non-reflective) events can be achieved. A discussion of features observed in optical fibers, and systems and methods for measuring such features, is described in U.S. Pat. No. 6,710,862, issued on Mar. 23, 2004 to Wilson et al. and assigned to the common assignee of the present application, the disclosure of which is incorporated herein by reference in its entirety.

It is important to know how much attenuation occurs in a length of fiber before the fiber is used in a communications system. Also, it is important to determine whether excessive power loss occurs once the fiber has been placed in a communications system. Excessive power loss can be caused for various reasons, such as by excessive bending of the fiber, by mechanical damage to the fiber (for example, damage caused by excavators who inadvertently crush or break one or more strands of fiber in a cable), and by imperfections in coupling or splicing of fiber ends. Even without excessive power loss, there are other processes that cause an optical signal traversing a fiber to be attenuated.

Once the fiber is used in a communications system, it is important to assess the magnitude of any attenuation through the entire length of the fiber, and also to detect where any excessive power loss is occurring so that remedial action may be taken. Also, there are often contractual terms relating to installation of optical fiber that require the power loss at any splice not to exceed a certain magnitude.

In general, an OTDR instrument sends one or more pulses of laser light through the optic fiber. The light used is generally controlled as to wavelength, common wavelengths being 850, 1244, 1300, 1310, 1410, 1480, 1550, and 1625 nm. The light sources used are generally solid state laser sources, although in principle any laser or other optical source operating at the correct wavelength and intensity could be used. Each pulse emitted by the light source has an intensity or amplitude, and a controllable width or time duration, which for some applications can be a predetermined width or time duration. The interval between pulses, or pulse rate, is also controllable, and is often predetermined. In order to control the intensity of the illumination, it is in principle possible to control either the illumination source itself or to provide in-line optical attenuation or both to control the illumination intensity applied to an optical fiber. For example, one can use an illumination module comprising an illumination source, such as a laser, and an in-line optical attenuation device as an optional component of the illumination module. For example, any one of a neutral density filter, a liquid-crystal based optical attenuator, a laser attenuator such as that offered for sale by Cleveland Crystals, Inc., 676 Alpha Drive, Highland Heights, Ohio 44143, or a diffractive laser attenuator such as that offered for sale by Del Mar Ventures, 4119 Twilight Ridge, San Diego, Calif. 92130, can in principle be used as in-line optical attenuation devices.

In layman's terms, the pulse of laser light traveling through the fiber is somewhat akin to a flashlight being shined into fog (which creates a backscatter of light) or shined through a window (which causes a reflection of some light). The OTDR instrument measures the amount of light being sent backward through the fiber as being representative of the amount of light attenuated. Although the OTDR instrument measures only the amount of light being sent back through the fiber, and not the amount of light being transmitted through the fiber, there is a very close correlation between the two amounts.

The OTDR instrument includes a very precise photodetector that measures the power level of light coming back through the fiber. In some embodiments, the photodetector is an avalanche photodiode (hereinafter "APD"). The OTDR instrument also includes a very precise and sensitive clock that is provided a signal when the laser pulse is fired into the optic fiber and when light is sensed by the photodetector. Light travels in a vacuum faster than it travels in matter (the index of vacuum being defined as one, and the ratio between the two being called the index of refraction of the particular type of matter). The index refraction of the material from which the fiber is constructed is generally known. Therefore, the OTDR instrument can calculate the distance along the length of fiber where light has been attenuated and the magnitude of that attenuation.

In some embodiments, the OTDR instrument is coupled with a controller to create a graph of light signal level (along the Y axis) and distance along the optic fiber (along the X axis) and to plot a series of data points based upon a sampling of the photodetector and the clock. The series of points may be connected together in what is known as a trace. Since light travels in the fiber at a known velocity, the distance axis can also be represented as a time axis, through the relationship distance=velocity×time.

The accuracy of the signal level trace is dependent upon the accuracy of the photodetector as well as the correlation between the amount of light traveling back through the fiber as compared with the amount of light transmitted through the fiber. The accuracy of the distance of the feature in the fiber causing the signal loss from the end of the fiber into which the laser is fired is dependent upon the pulse width, the precision of the clock, and the accuracy of the index of refraction (throughout the length of the fiber) and to some degree is dependent upon the spacing of the data points that are used to form the trace.

Normally, the wavelength of the laser light in the OTDR is the same as the wavelength of light to be transmitted for communications purposes through the fiber. In some embodiments, in what is known as a bi-directional test, the fiber is tested by sending a laser pulse down the fiber from each end.

FIG. 1 is an idealized diagram 100 that illustrates features of a reflectance measurement using prior art OTDR instruments. In FIG. 1, distance is plotted along the horizontal axis and reflected power is plotted along the vertical axis. Convenient units for each axis are used, for example kilometers or miles for distance, and a decibel scale for reflected power. As is seen in FIG. 1, reflections at structures where the optical index changes abruptly are represented by relatively narrow "spikes" 110, 120, that typically have a width corresponding to a pulse width $\Delta T$ of an illumination pulse. Reflections from optical fiber where there are no abrupt index changes exhibit a linearly sloped region 130 that indicates attenuation due to backscatter. A region 140 where attenuation becomes immeasurably small corresponds to a distance beyond the end of an optical fiber. While not shown in FIG. 1, it is also known that more pronounced sloped regions of the trace indicate so-called "events" which cause more severe power loss. Events caused by certain phenomena (e.g., a splice) often possess a characteristic, unique signature or waveform indicative of the type of phenomenon. These events are of importance because they indicate the presence and location of some irregularity in the fiber that might need correction or remedy. As indicated in FIG. 1 with respect to the reflection 120, corresponding to a distal end reflection of an optical fiber, the reflection 120 represents the sum of a backscattered power $P_{backscatter}$ and a reflected power $P_{refl}$. In FIG. 1, the reflection 120 is compared to the backscattered power alone, $P_{backscatter}$. For example, the backscatter 130 that is seen at a distance location to the left of the location indicated as point 150 on the horizontal axis is compared to the refection 120. By comparing the two power values, one can obtain a value for the reflected power, $\Delta F$. The signal also provides a measure of the location in distance where such reflection occurs.

Although an event happens at a particular point or within an extremely short range of distance within a fiber (such as where a fiber end is spliced to the end of a different fiber), the trace will show that the power loss occurs over a short distance as shown in FIG. 1. For example, the OTDR trace of a fiber might indicate that the event of a splice starts at 10.0 kilometers and ends at 10.1 kilometers from the fiber end through which the laser is fired, where in actuality, the splice is 10.005 kilometers from such end. Thus, an event on a trace is said to have "extent". Such extent is caused by the width of the laser pulse as well as the natural intervals caused by data point sampling of the return light. Each event is also deemed to have a "start" and an "end", in accordance with conventional standards, for example, as indicated by the two vertical lines in FIG. 1. Also, not every relatively sudden attenuation is deemed to be an "event". Various conventional parameters determine whether a power loss has characteristics sufficient to deem the power loss an "event".

Most fiber optic cables include a plurality of optic fibers, with cable being currently commercially available with up to 432 such fibers in what is known as "432 count" cable. Each fiber within the cable is coded and is typically tested for light attenuation using an OTDR instrument. The systems and methods of the invention can be applied to a single fiber. While the application of the systems and methods of the invention will not be discussed with regard to a plurality of fibers, the systems and methods of the invention can be applied to any number of fibers in sequence.

In addition to the imperfections of distance accuracy previously mentioned, the problem of measuring the properties of a particular fiber or of locating an event is further compounded depending on the type of fiber cable that is being tested. For example, one type of fiber optic cable comprises many strands of fiber helically wrapped around a central supporting core such that the length of the outer fibers is longer than the length of the inner fibers, and both are in general longer than the linear length of the cable. Another type of cable, so-called ribbon cable, comprises optic fibers that are placed in parallel (without any helical wrapping) in which case the lengths of the fibers are generally substantially the same as the cable length.

Figure 2:
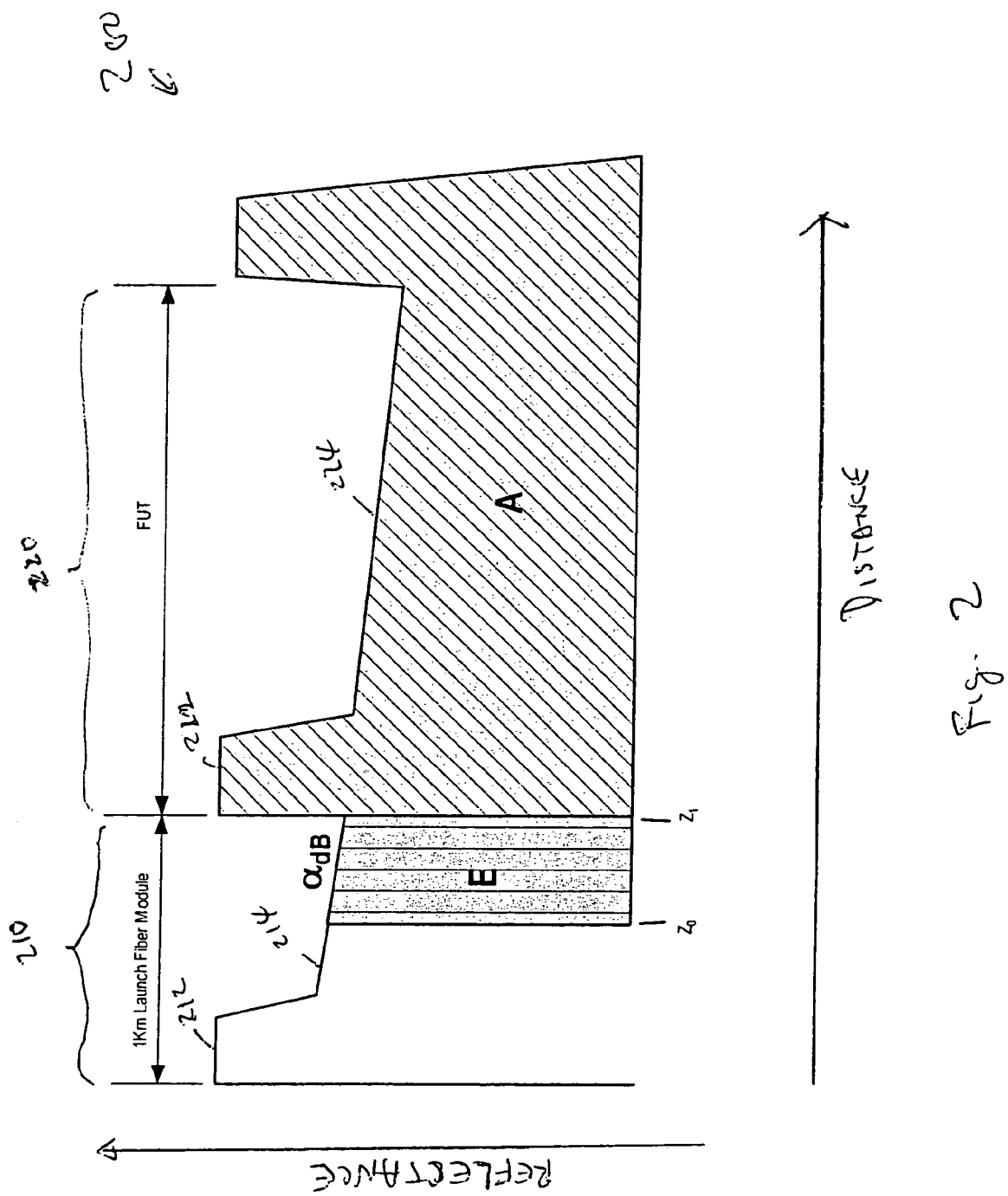
FIG. 2 is an illustrative diagram showing an optical fiber under test with a launch optical fiber module, according to principles of the invention.

FIG. 2 is an illustrative diagram 200 showing an optical fiber under test 220 with a launch optical fiber module 210, such as an STFM having calibrated (predefined) characteristics. In FIG. 2, distance is represented along the horizontal axis, and reflectance (or intensity of the returned optical signal) is represented along the vertical axis. As shown in FIG. 2, the launch optical fiber module 210, which in some embodiments is an STFM, is nominally 1 kilometer in length. While this length is nominal, and can vary somewhat, each STFM is measured quite precisely as to its optical length as a function of illumination wavelength, preferably to a precision of 1 meter, more preferably to a precision of 0.1 meter, and still more preferably to a precision of 0.01 meter. Light is introduced to the STFM at one end, which in FIG. 2 is the leftmost end, and which end is proximal to an electromagnetic radiation detector module. Neither the illumination module nor the radiation detection module is shown in FIG. 2.

A region of the STFM at a distal end is a calibrated backscatter section of the STFM, denoted in FIG. 2 as the region labeled "E" that extends from a distance denoted $Z_0$ from the proximal end of the STFM to a distance denoted $Z_1$ from the proximal end of the STFM. The region between $Z_0$ and $Z_1$ is characterized by a backscatter slope denoted $\alpha_{dB}$. In FIG. 2, the FUT is shown as the region denoted by 220, which has a length that may not be known with precision at the beginning of the OTDR measurements. The region labeled "A" corresponding to substantially the entire FUT represents the backscatter data observed from the FUT during an OTDR measurement of ORL. The peaks 212 and 222 represent-reflection corresponding to the interaction of a pulse with an end of a fiber (where an abrupt index change occurs), while the substantially linear (idealized) slopes 214 and 224 represent the reflectance caused by substantially uniform backscatter along the length of a fiber. In FIG. 2, the parameters have the meanings given below:

$Z_0$=the start of backscatter section, used to calculate launch power;

$Z_1$=the end of backscatter section, used to calculate launch power;

$\alpha_{dB}$=the slope of backscatter section ($Z_0$, $Z_1$) in dB/km;

E=the integration (sum) of linear domain data points from $Z_0$ to $Z_1$;

A=the integration (sum) of linear domain data points from $Z_1$ to noise floor;

N=the IOR of the FUT;

c=the speed of light; and

BSC=the backscatter coefficient of the launch fiber.

The ORL calculation for the STFM is performed according to the following discussion, which can be derived by correcting a continuous wave analysis to account for the fact that a pulsed source is used, and to account for the fact that the data recorded are converted to digitized form. The data are therefore discrete data, rather than continuous data, as is generally the case for computer-based instrumentation.

The return signal is numerically integrated, or summed over a finite number of points in a data trace. The area E of FIG. 2 is therefore given by $$E = \Sigma X_i \text{ for } i = Z_0 \text{ to } Z_1 \qquad \text{Eqn. (2)}$$

where $X_i$ is the value of a datapoint of the trace. Similarly, the numerical integration for area A is the sum of all datapoints $X_i$ from the location $Z_1$ to the end of the FUT. The sum of A and E represents the total return signal seen by the radiation detection module. If more than one FUT were to be used in series or "daisy-chain" configuration, the integrated area corresponding to the losses of all the FUTs could be obtained as a single sum taken from the location $Z_1$ to the distal end of the last FUT. In some cases, if a signature such as the peak at the proximal end of a fiber, such as peaks 212 or 222 of FIG. 2, can be identified for one or more successive fiber segments, it is possible in principle to determine an ORL for such a segment identified by a peak at each end thereof.

For a substantially linear slope representing backscatter such as slopes 214 or 224, the slope can be characterized as having a slope of magnitude m [in units of dB/km] and a slope $\beta=-m/4.343$, where the units of $\beta$ are $km^{-1}$. For a fiber segment having such a substantially linear slope [in units of dB/km], the backscatter for a portion of the linear slope region can be calculated based on physical principles. Using a Beer's Law type relationship, which is well known in the optical arts, and which in the present instance can be understood to represent the principle that a slab of defined thickness of an optical fiber exhibiting a linear slope in units of dB/km, (or more generally, in units of dB per unit length) scatters a fixed fraction of the light reaching it, one obtains a relationship that illumination power falls off as exp(-$\beta \times$ slab thickness). Since the light has to pass through the slab twice, once entering and once leaving, the exponential decay is squared, or the falloff is proportional to exp(-2$\times\beta\times$slab thickness). The slab thickness is equal to the optical resolution of the trace, denoted by rs. Therefore, the return intensity for any slab starting at distance z into the fiber will be given by $$P_{backscatter}(z) = P_0 * S * T \exp(-2\beta(z+rs)) \qquad \text{Eqn. (4)}$$

where

S=a scattering coefficient in seconds$^{-1}$;

T=pulse duration in seconds; and $P_0$=the optical power of the pulse at the input surface of the fiber.

In the notation of equation (4), the value of E is given by $$E = \Sigma P_0 * S * T \exp(-2\beta(Z_i+rs)) \text{ for } Z_i = Z_0 \text{ to } Z_1 \qquad \text{Eqn. (5)}$$

A sum of a finite number of exponentials may be represented by the infinite sum of a first set of exponentials beginning at the start of the sequence minus a second infinite sum of a second set of exponentials beginning just beyond the end of the sequence. Applying this relationship to the sum in equation (5) and simplifying, we obtain $$E = P_0 ST[\exp(-2\beta(Z_0+rs))-\exp(-2\beta(Z_1+rs))]/[1-\exp(-2\beta rs)] \qquad \text{Eqn. (6)}$$

In one embodiment, since for small x, 1–exp(x) is substantially equal to x, and given that 2$\beta$rs is small compared to 1, the denominator 1–exp(-2$\beta$rs) is approximately –2$\beta$rs, one solves for the input power $P_0$ by algebraic manipulation of the equation (6) with use of the approximation. However, given the computational capacity of present day high speed microprocessors, operating at gigahertz frequencies, there is no need to make any approximations. In another embodiment, one solves equation (6) by direct algebraic manipulation to represent $P_0$, and computes the value of $P_0$ directly from equation (7)

$$P = E[1-\exp(-2\beta rs)]/ST[\exp(-2\beta(Z_0+rs))-\exp(-2\beta(Z_1+rs))] \qquad \text{Eqn. (7)}$$

because all of the quantities on the right hand side are known by measurement and from the predefined characteristics of the STFM.

Inputs BSC, $Z_0$, $Z_1$ and $\alpha_{dB}$ are defined by the STFM and are not considered a potential source of error. N for the FUT is user supplied. The OTDR instrument allows the user to select these values from a table, listed by fiber type. Potential sources of error in the ORL calculation are the recovery speed of the OTDR optics and the potential for the optics to be saturated or clamped during a large reflection. To remove these sources of error, a 5 $\mu$S, high-resolution pulse is combined with an auto-attenuation capability. The long pulse width reduces the potential for saturation. Use of the high-resolution amplifier provides a very accurate representation of the reflected width of a pulse (e.g., true deadzones). Therefore, the accuracy of area "A" is assured.

The STFM is referred to as "smart" because it can be identified on the PCI bus of a conventional general purpose programmable computer, such as a personal computer, and has stored information regarding its length, backscatter coefficient (as a function of wavelength $\lambda$), IOR (as a function of wavelength $\lambda$) and attenuation (as a function of wavelength $\lambda$) that can be provided to a software application running on the computer. This information removes any uncertainty in the BSC, $Z_0$, $Z_1$ and $\alpha_{dB}$ inputs to the ORL calculation for determining a calibrated illumination intensity provided by the illumination module.

Figure 3A:
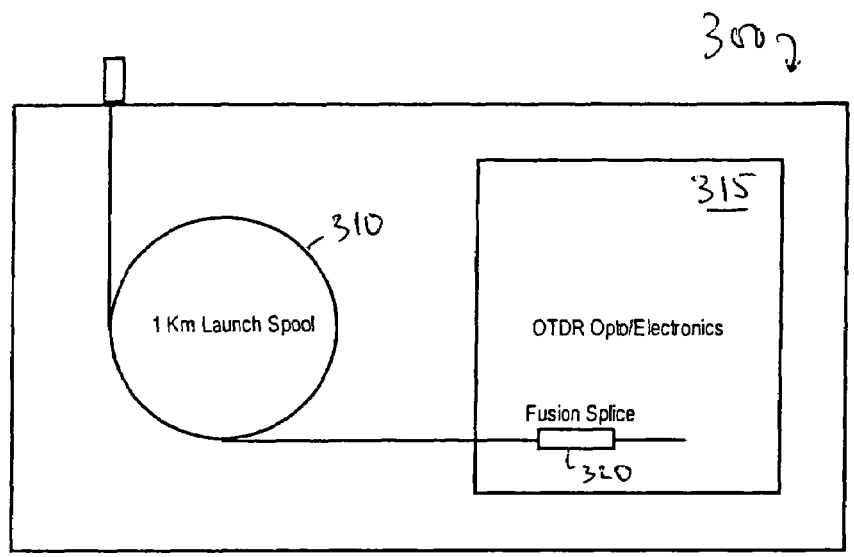
Figure 3B:
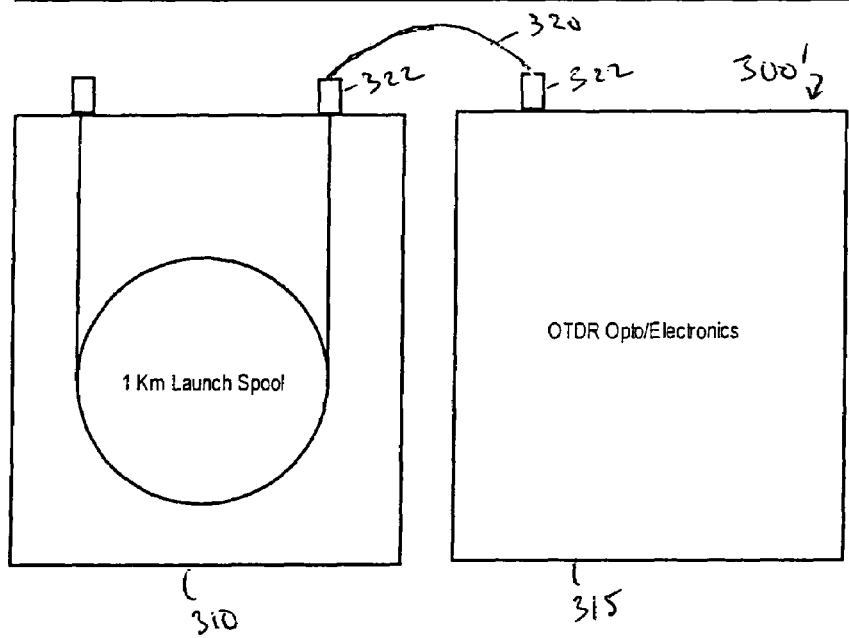

FIGS. 3A, 3B, and 3C are diagrams 300, 300', 300" showing three illustrative embodiments of the OTDR instrument 315 with an associated launch fiber optic module 310. In FIG. 3A, which may be considered a "dedicated" instrument, the launch fiber optic module 310 (or STFM) is attached to the optical train of the OTDR instrument 315 with a fusion splice 320, by which fusion splice 320 the STFM is substantially permanently (or undetachably) attached to the OTDR instrument 315. The design shown in FIG. 3A, where the launch spool is integrated into the module has the advantage of combining two functions in one mechanical housing. It also guarantees the connection between the OTDR optics and the launch spool, which is an important consideration in insuring the accuracy of the calculation of area E. In FIG. 3B, the OTDR instrument 315 is connected to the launch fiber optic module 310 using conventional mechanical optical fiber connectors. The second design has the advantage of modularity. As shown in FIG. 3B, a patch cord 320 and mechanical connections 322 are used between the launch fiber optic module 310 and the OTDR instrument 315, which could introduce errors in the calculation of area "E". In yet another embodiment, as shown in FIG. 3C, the OTDR instrument 315 and the launch fiber optic module 310 are directly connected using a conventional demountable optical fiber connector 322. Another connector 322 is present to connect the launch fiber optic module 310 to a FUT (not shown).

Figure 4:
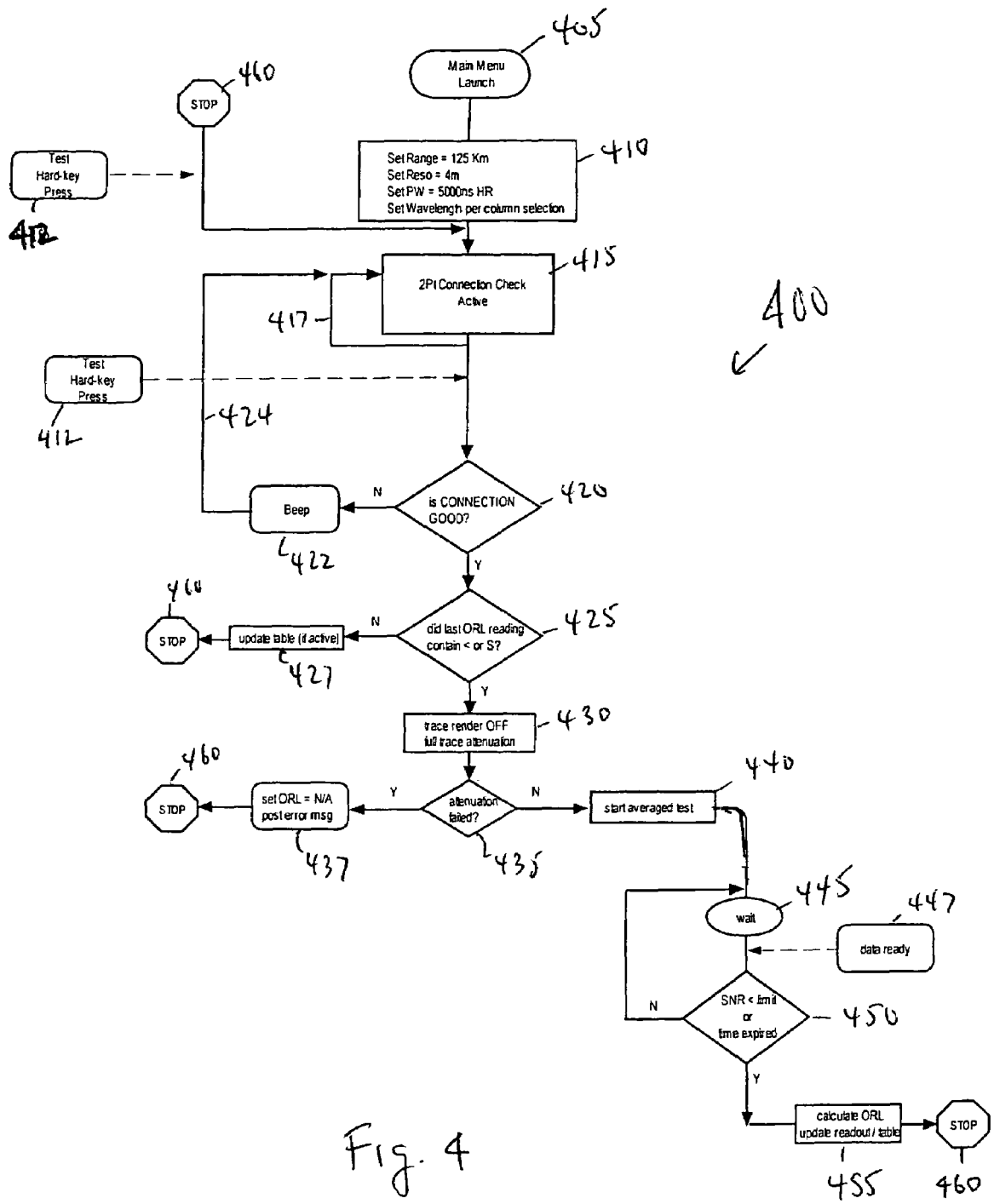
FIG. 4 is a flow chart that illustrates the step by step process of making an ORL measurement on a FUT using the OTDR instrument of the invention, and can also be understood to define the operation of a software application that controls the operation of such an OTDR instrument.

FIG. 4 is a flow chart 400 that illustrates the step by step process of making an ORL measurement on a FUT using the OTDR instrument of the invention, and can also be understood to define the operation of a software application that controls the operation of such an OTDR instrument. At oval 405, the operation of the instrument starts with the launching of the main menu of the application, which is displayed on a display of the instrument. As indicated hereinabove, the display in some embodiments is a touch screen that allows an operator of the apparatus to interact with the systems and methods of the invention as necessary.

At step 410, the software controls the setting of default values for various parameters. As illustratively indicated in step 410, the range is set to 125 kilometers, the resolution is set to 4 meters, the pulse width is set to 5000 ns (nanoseconds) (equal to 5 $\mu$s) and the wavelength for the test is set according to a selection of the operator, who elects a column in an output table (which is discussed in more detail hereinafter). Alternatively, in a simpler field test instrument, the operator selects the wavelength by moving a switch or keying in a value, such as a wavelength or a fiber type. As indicated hereinabove, the OTDR instrument allows the user to select these values from a table, listed by fiber type.

At this point in the method, the instrument and method provide the operator an opportunity to perform a test of the proper operation of the system and method by pressing a test key, as indicated by step 412. A failure of the test at this point causes the instrument and method to halt, as indicated by the Stop indicator 460. When the instrument and method stop, in some embodiments the operator is provided a signal that faulty operation has occurred.

Under normal operating conditions, the system and method proceed to step 415, which involves checking the connection of the instrument to a FUT. The instrument can have two states; in an idle state, the illumination module is not operating, and the instrument loops as indicated by arrow 417 under the control of software. When the illumination module becomes active, the software senses that the illumination module is on and performs a test to see whether a FUT has been connected.

In one embodiment, the test is performed using the following steps: the system and software automatically position a cursor at a location just before the end of the STFM. The 5.0 $\mu$s pulse is 500 meters long. In one embodiment, the second cursor is set at 1.5 times the pulse width from the first cursor. (e.g., the first cursor is set at 1.0 km and the second at 1.75 km). The pulse width is the length of the OTDR optical probe pulse as it appears on the OTDR display, which is related to the pulse duration by $$PW=.0.5D(c/N)$$ Eqn. (8)

where
PW=pulse width;
D=pulse duration;
c=speed of light; and
N=Group Index (Index of Refraction).

The system and method then enters the 2 point loss measurement mode. The system does an autocalibration of light intensity for the location at the distal end of the STFM, and indicates that the ORL is not meaningful. The system then begins a real time scan mode of operation. In the real time scan mode, the system operates in a loop, having N=128 cycles or steps. The system then records reflectance data for a distance that includes a t least a portion of the FUT length, and determines 2 point loss data. After recording N readings, the system averages the 2 point loss measurement and compares the average to a threshold value. If the average is less than the threshold value, a FUT is connected to the STFM. If a FUT is properly connected, the system measures the ORL of the FUT and updates the ORL readout on that display (or otherwise informs an operator of a test result).

The test is represented by decision diamond 420. If the test demonstrates a good connection the system and method move on to the test indicated at decision diamond 425. However, if the test fails (e.g., a connection to a FUT appears not to exist, the instrument and method proceed to step 422, which is reported to the operator by a beep or other audible of visual indication. The system and method then proceed as indicated by arrow 424 back to strep 415 to repeat the connection check. Optionally, in some embodiments, the operator has an opportunity to hard test of the system by activating a button, a switch, a hard key, or the like, as indicated at step 412.

At decision diamond 425, the instrument and method perform a test on an ORL trace returned from the STFM and the FUT. The test involves examining the trace for the presence of a saturated signal, indicated at decision diamond 425 as "<or S" which indicates saturation. If the test indicates that there is no saturation, the system and method move on to step 427, which represents taking an ORL measurement and updating a table entry. The system then stops, at step 460.

If the test indicates that saturation is present, the system and method move to step 430, which is the automatic attenuation procedure. During attenuation, the trace results are optionally not displayed for the operator, as they are in general of no use for analysis. The auto-attenuation algorithm does not depend on event detection but simply finds the highest level on the FUT trace and takes corrective action to attenuate the trace out of saturation, for example by controlling at least one of the illumination, the detector gain, the amplifier gain, or optionally by employing an in-line optical attenuator to reduce the illumination level. After applying the auto-attenuation algorithm, the system and method attempt again to test for saturation. In some embodiments, the auto-attenuation algorithm can be applied repeatedly to attempt to obtain a trace free from saturation events.

The full attenuation function starts changing the APD bias to a reduced setting, and checks for saturation. If there is still saturation, then the laser power is decremented in a hunting loop, until either the trace becomes unsaturated or the lower limit of the valid laser power setting is reached. If the attenuation fails to provide an unsaturated trace, as indicated by the arrow labeled "N" leaving decision diamond 435, the system indicates an error condition at step 437, and then stops at step 460.

If the attenuation process succeeds, as indicated by the arrow labeled "Y" leaving decision diamond 435, the ORL test using an averaged signal begins, as indicated at step 440. The averaged test involves taking a measurement, and waiting for a delay time at step 445. The data obtained is tested at decision diamond 450 to see if a signal-to-noise ratio is within a defined limit, or if the system has timed out. If the test is satisfied, the resulting ORL is calculated, displayed, and stored at step 455, and the system stops at step 460. If the test fails at decision diamond 450, the system loops to wait state 445, and additional data is taken and the signal-to-noise/time limit test is repeated. Optionally, data ready is indicated at step 447 each time the data taking loop is traversed.

Figure 5:
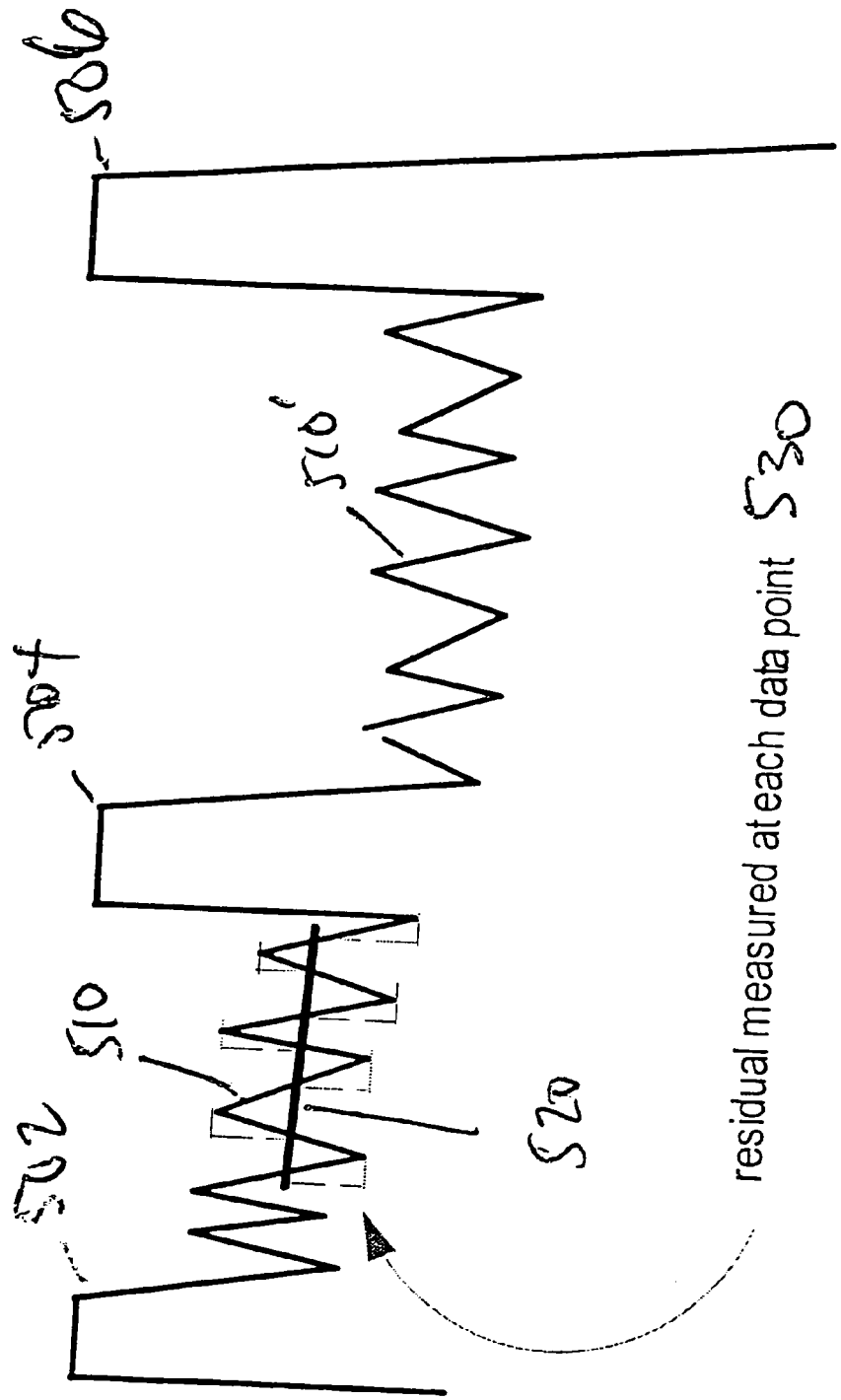
FIG. 5 is a diagram that illustrates how the LSA method is applied to reflection data.

FIG. 5 is a diagram 500 that illustrates how the LSA method is applied to reflection data. In FIG. 5 distance is represented along the horizontal axis and reflectance is represented along the vertical axis. Feature 502 is a reflectance peak from the proximal end of the STFM (e.g., the end nearest the illumination module). Feature 504 is a reflectance peak from junction of the distal end of the STFM (e.g., the end farthest from the illumination module) and the FUT first end. Feature 506 is a reflectance peak from the distal end of the FUT (the FUT second end). The LSA processing involves the measurement of signal to noise ratio at the second half of the STFM backscatter section by calculating the standard deviation (SD) of the residuals 530 from an LSA line 520 through the data 510 from that backscatter section, and continuing to average until the SD drops below a set threshold (or a time limit is reached). The data 510' from the backscatter section representing the second half of the STFM fiber section provides a convenient place to make an LSA measurement, because one has assurance that no events will be present to distort the data. Since the loss across the STFM—FUT connection is limited by the 2Pt connection checker from being excessive, one expects that the backscatter quality before and after the STFM-FUT connection will be similar.

Another method to determine optical loss is to integrate (in the linear domain) under each reflection from event start to event end and use the ratio of event area to total area as the measure of relative contribution to the overall ORL measurement. In this way, a measurement taken that includes both the ORL of the STFM and the ORL of the FUT can provide an ORL for the FUT. One can determine the ORL for the STFM because one knows the calibrated BSC for the STFM, and one measures Pr for the STFM, as has been described above.

Having determined $ORL_{total}$ by measurement, and $ORL_{STFM}$ by calculation, one deduces that $ORL_{FUT}$ will be represented by the relation $$ORL_{FUT}=ORL_{total} \times A/(A+E)=ORL_{total}=ORL_{STFM}.\qquad \text{Eqn. (9)}$$

Alternatively, one can calculate $ORL_{FUT}$ by application the definition of ORL given in equation (1). For this calculation, the input power to the FUT is taken equal to the calibrated input power $P_0$ reduced in intensity by the backscatter caused by a first inbound pass through the STFM. The output power from the FUT is equal to the observed reflected power, increased in power to account for losses caused during the second outbound pass through the STFM.

Figure 6:
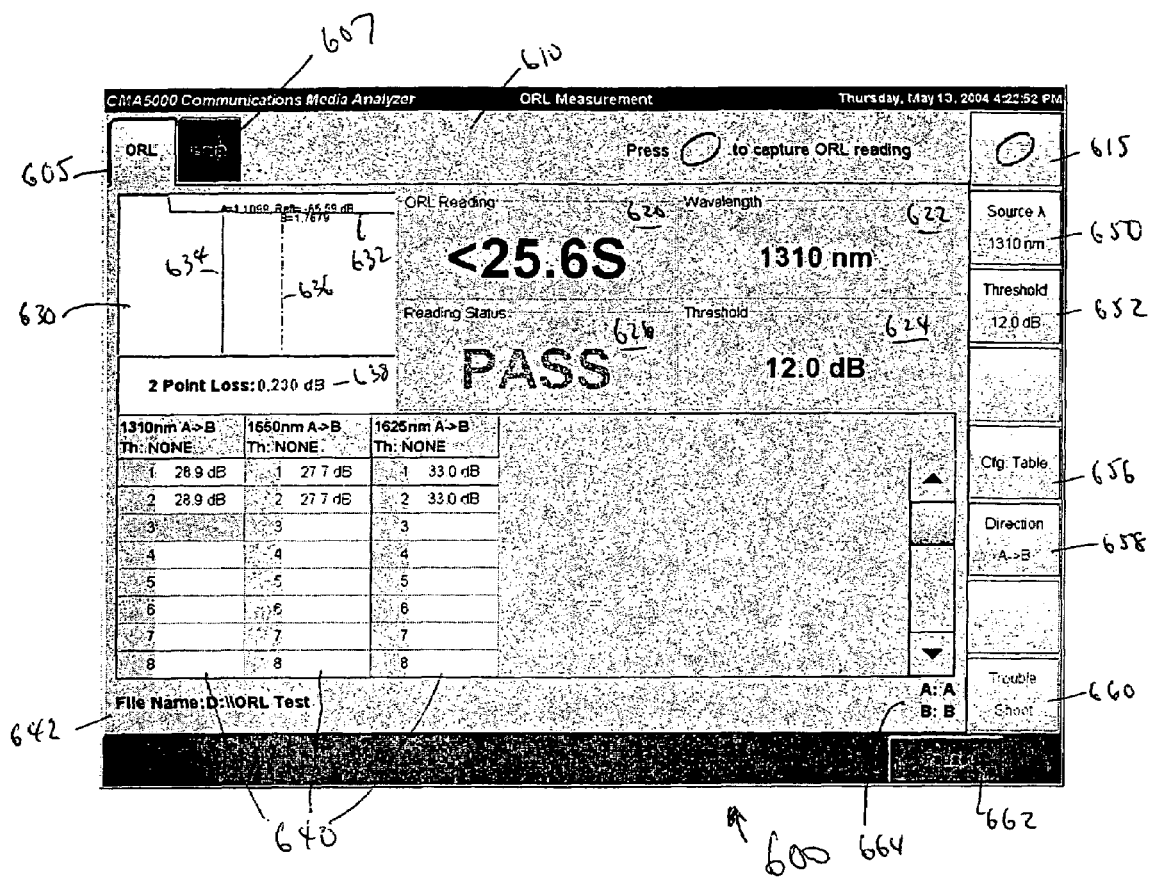
FIGS. 6 through 9 are screen shots of an embodiment of the invention, illustrating features of a graphical user interface implemented on instrument having a touch-screen display.

FIGS. 6 through 9 are screen shots of an embodiment of the invention, illustrating features of a graphical user interface (GUI) implemented on instrument having a touch-screen display. FIG. 6 is a screen shot 600 that illustrates a GUI that is presented to an operator of one embodiment of the invention implemented on a sophisticated testing apparatus, specifically at the time when the instrument has just completed a connection check, corresponding to step 415 of FIG. 4. The GUI is presented in the style of Windows™—compatible applications, Windows™ being a trademark of the Microsoft Corporation of Redmond, Wash. that is used in conjunction with a specific family of well known operating systems and associated software development tools. Those of ordinary skill in the programming arts will understand that it is equally possible to design other formats of GUI interfaces, including those that will operate in conjunction with other operating systems, such as Unix, or Linux. In FIG. 6, a screen region 605 is used to indicate that an ORL measurement is the active application. Regions of the GUI will be understood to represent either or both of display regions that provide information to the operator (e.g., perform a display function), and pushbuttons that allow an operator to communicate with and to control as necessary the operation of an instrument or method (e.g., perform a communication/control function). Region 605 in one embodiment has both the display function and the communication/control function. A region 607, shown in a darker shade or color to indicate inactivity, is a help button that an operator can press to activate an on-line help service, should the operator require instructions in the proper operation of some aspect or feature of the instrument or test procedure.

In the embodiment shown in FIG. 6, region 610 is a display region that prompts the operator to press pushbutton 615 in order to capture an ORL reading. The display in region 610 uses both graphical and textual information to prompt the operator. Region 620 is a display region that indicated in the example shown in FIG. 6 that a fiber under test is returning a reading that is in saturation, and indicated by the "<" symbol preceding the numerical portion of the displayed information and by the "S" shown after the numerical portion of the displayed information. Region 622 is a display showing an operating wavelength of the instrument, namely 1310 nm. Region 624 is a display showing a threshold value, namely 12.0 dB, which can be varied under program control, or possibly by an operator. Region 626 is a display indicating in the embodiment shown in FIG. 6 that the connection check has resulted in a pass condition, e.g., a suitable FUT is connected to the STFM of the instrument. Region 630 is a display substantially similar to an oscilloscope-type display in which data is shown with a horizontal axis representing time or distance, and a vertical axis representing amplitude. Region 630 as illustrated is displaying a single trace 632. Further data is presented with respect to trace 632, including the reflectance represented by the slope of the line 632. Also illustrated in region 630 are cursor lines 634, 636 that indicate points corresponding to selected distances along a fiber. Within region 630, the cursor 634 is identified as being at fiber location 1.1099 kilometers, and the cursor 636 is at 1.7679 kilometers. Region 630 can display the type of test (e.g., a 2 point loss test) and a test value (e.g., 0.230 dB) as shown at 638. Further data is presented with respect to trace 632, including the reflectance represented by the slope of the line 632. At location 642, a filename, including directory and path, are displayed.

Near the bottom left of the screen shot 600 are three columns 640 for data taken on fibers, including such information as the wavelength of illumination applied, the direction of the test (e.g., from end A to end B, denoted A->B), a value for threshold value setting (Th), and a plurality of cells in which reading can be entered and recorded for later retrieval and review. Along the right side of the screen shot 600 are a series of buttons that are both displays and communication/control devices. Button 650 indicates that the source wavelength is 1310 nm. Pressing button 650 cycles the selected wavelength through a sequence of values representing the available wavelength that the instrument can provide. Button 652 displays a threshold value, and allows the operator to increase or decrease the value by pressing the button, for example above the midline to increase the numerical value and below the midline to decrease the numerical value. Button 656 allows an operator to configure the table shown at 640. Button 658 allows the operator to select a direction for a test. Button 660 allows an operator to institute a troubleshooting routine and/or to activate a display of instructions for troubleshooting. Button 662 is a button that allows the operator to pause the operation of the instrument and method. Region 664 indicates whether ports A and B are configured in conventional configuration or are reversed.

In further detail, the troubleshooting function when activated performs the following steps: 1. run analysis on the trace from which the ORL reading was derived; and 2. transfer display control to a variant of the OTDR Analysis tab (e.g., the ORL Analysis tab). The ORL Analysis tab includes a specialized soft key layer and event table that sorts events in reflectance order but otherwise behaves like the standard OTDR Analysis tab. In the troubleshooting mode, the analysis parameters are selected (to the extent possible) with a bias against detection of high loss events and towards detection of highly reflective events. That is, the Loss Threshold is preferably set to its maximum value and the Reflectance Threshold is preferably set to −40 dB (3.5 dB tall@5000 ns). These parameters can be automatically set by a predefined event table that includes R>=0 reflective events and no non-reflective (or false) events. In some embodiments, the dB delta from the top of a reflection to the top of the display can be used to determine its relative contribution to the overall ORL number. The deltas for the set of R detected reflections should be sorted in ascending order (smaller delta is a larger contributor) to determine the top N=min(R, 3) contributors to the ORL measurement.

There is an additional benefit that is available in pulsed measurements of OTDR. In CW measurements, it is not possible to isolate to specific causes when excessive ORL is present. In OTDR ORL measurements, the highest contributors can be identified by evaluating the collected trace data used to make the ORL measurement, and evaluating the relative amplitude of the reflections (peaks) of the individual connectors/artifacts. In addition, a 'more info' function is offered to allow a new automated standard OTDR trace collect to be performed for better evaluating the spatial resolution and details of events on the fiber.

Figure 7:
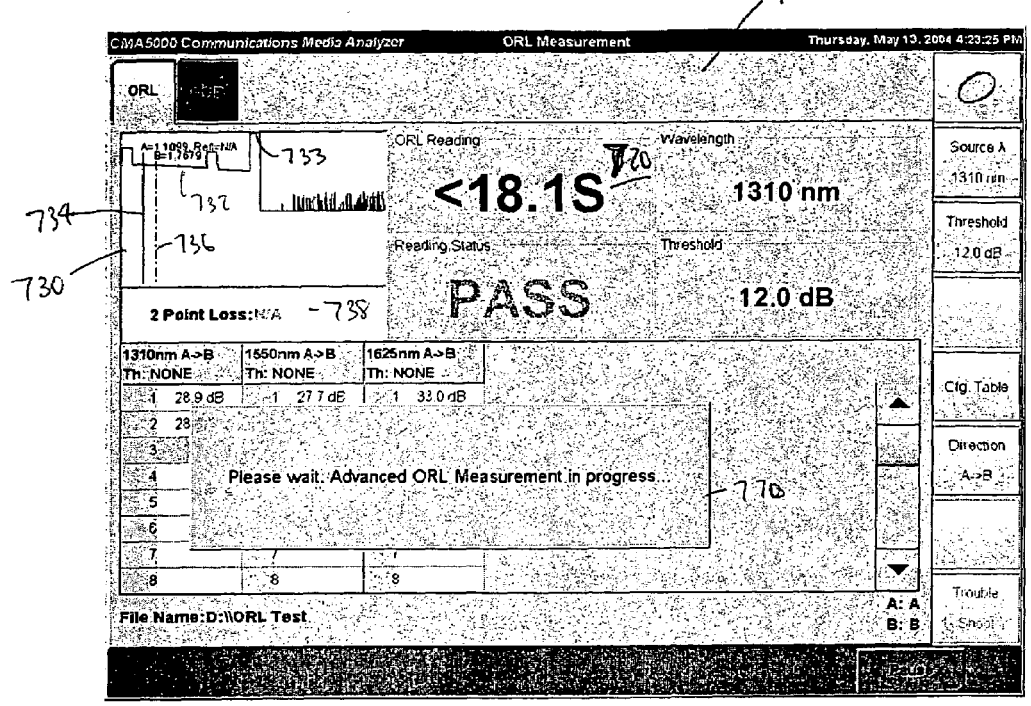

FIG. 7 is a screen shot 700 that illustrates a GUI that is presented to an operator in one embodiment, specifically at the time when the instrument has just completed a saturation test, corresponding to step 425 of FIG. 4. Region 710 is now blank, because the operator is not being prompted to do anything. Region 720 indicates a saturated reading for a first attempt at an ORL test, again as indicated by the "<" symbol preceding the numerical portion of the displayed information and by the "S" shown after the numerical portion of the displayed information.

Region 730 shows a trace 732 of the return signal from a fiber under test. The trace appears to have a saturation event at a point 733 where the trace 732 reaches the upper reflectance limit of the display region 730. Cursors 734 and 736 are displayed, cursor 734 being at a location 1.099 kilometers along the fiber and cursor 736 being at a location 1.7679 kilometers along the fiber. The 2 point loss test is returning a meaningless value, as indicated at 738. In FIG. 7, the software controlling and operating the instrument, and performing the test, has provided the notice in region 770 as a pop-up region, to inform the operator that the instrument and method are performing the measurement under automatic control.

Figure 8:
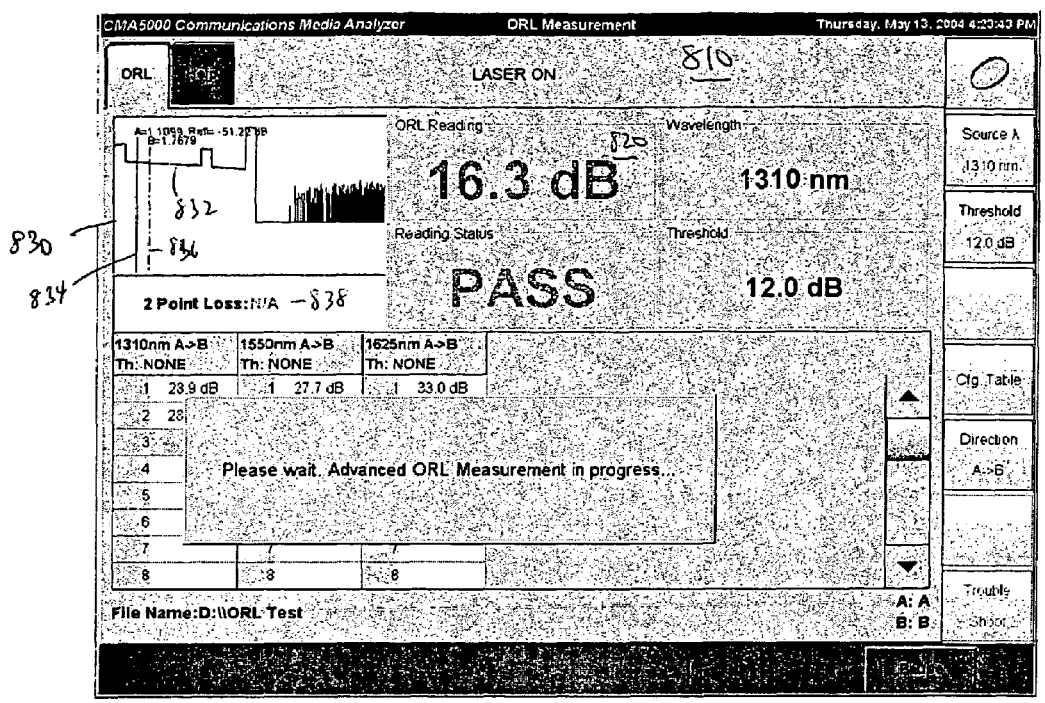

FIG. 8 is a screen shot 800 that illustrates a GUI that is presented to an operator in one embodiment, specifically at the time when the instrument is performing an automatic trace attenuation, corresponding to step 430 of FIG. 4. Region 810 indicates that a laser is operating. Region 820 indicates that the attenuation has resulted in an unsaturated reading, and there is no "<" symbol preceding the numerical portion of the displayed information or "S" after the numerical portion of the displayed information.

Region 830 shows a trace 832 of the return signal from a fiber under test. See also FIG. 9. The trace appears to have no saturation events. Cursors 834 and 836 are displayed, cursor 834 being at a location 1.099 kilometers along the fiber and cursor 836 being at a location 1.7679 kilometers along the fiber. The 2 point loss test is returning a meaningless value, as indicated at 838.

Figure 9:
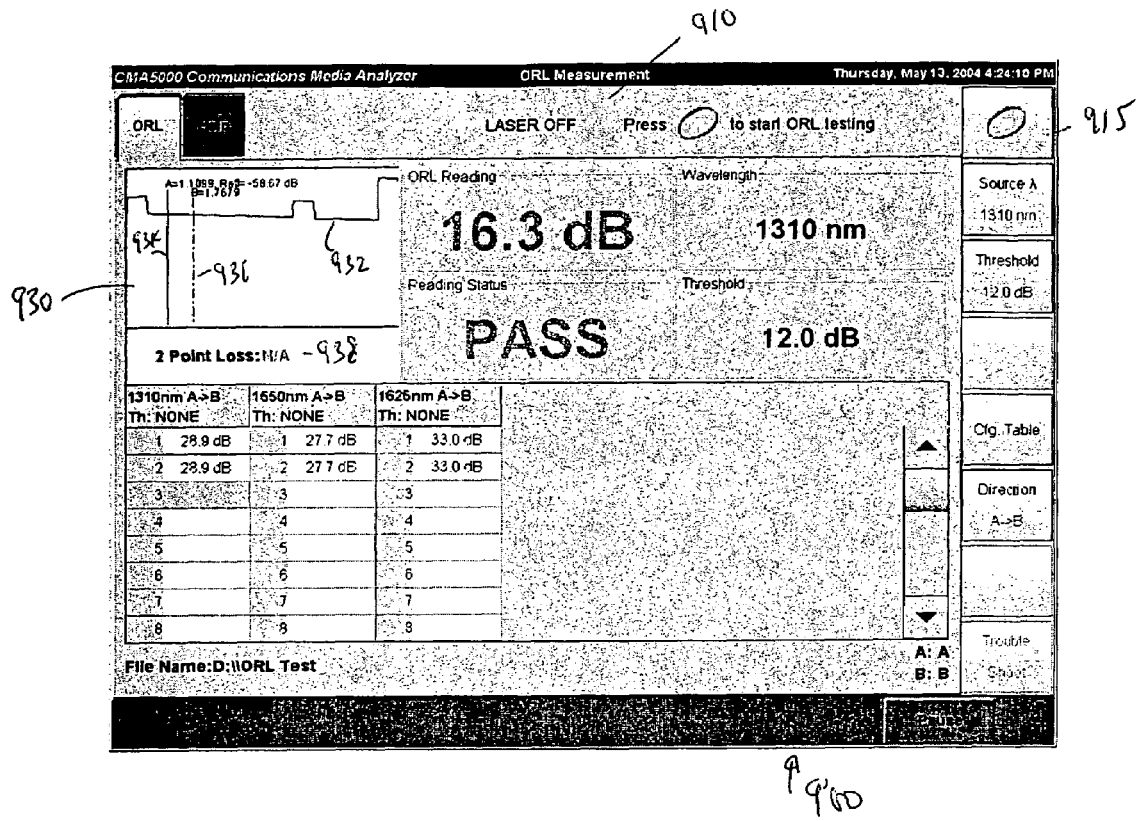

FIG. 9 is a screen shot 900 that illustrates a GUI that is presented to an operator in one embodiment, specifically at the time when the instrument has completed automatic attenuation and is ready to start an ORL test, corresponding to step 440 of FIG. 4. Region 910 indicates that a laser off, and that the operator can initiate the ORL test by pressing button 915. In some embodiments, an operator is not required to do anything to initiate the ORL test, which is carried out under computer control.

Region 930 shows a trace 932 of the return signal from a fiber under test. Comparison to the trace 832 of FIG. 8 indicates that a clean, unsaturated trace has been obtained. Cursors 934 and 936 are displayed, cursor 934 being at a location 1.099 kilometers along the fiber and cursor 936 being at a location 1.7679 kilometers along the fiber. The 2 point loss test is returning a meaningless value, as indicated at 938.

Machine-readable storage media that can be used in the invention include electronic, magnetic and/or optical storage media, such as magnetic floppy disks and hard disks; a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media. New media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and machine-readable symbols such as one and two dimensional bar codes.

Many functions of electrical and electronic apparatus can be implemented in hardware (for example, hard-wired logic), in software (for example, logic encoded in a program operating on a general purpose processor), and in firmware (for example, logic encoded in a non-volatile memory that is invoked for operation on a processor as required). The present invention contemplates the substitution of one implementation of hardware, firmware and software for another implementation of the equivalent functionality using a different one of hardware, firmware and software. To the extent that an implementation can be represented mathematically by a transfer function, that is, a specified response is generated at an output terminal for a specific excitation applied to an input terminal of a "black box" exhibiting the transfer function, any implementation of the transfer function, including any combination of hardware, firmware and software implementations of portions or segments of the transfer function, is contemplated herein.

While the present invention has been explained with reference to the structure disclosed herein, it is not confined to the details set forth and this invention is intended to cover any modifications and changes as may come within the scope and spirit of the following claims.

What is claimed is:

1. An apparatus for performing automated optical time domain reflectometry optical return loss measurements on an optical fiber under test, comprising:
    an illumination module having a controllable illumination source that provides illumination controllable in intensity with respect to time at a predefined wavelength;
    a radiation detection module having an electromagnetic radiation detector and an amplifier, said electromagnetic radiation detector responsive to said illumination provided by said illumination source and configured to generate a signal representative of said detected illumination;
    a first control module in communication with and configured to control said illumination module;
    a second control module in communication with and configured to control said radiation detection module;
    an analysis module in bi-directional communication with said first and second control modules and in communication with said radiation detection module, and configured to analyze characteristics of said signal representative of said detected illumination; and
    a launch optical fiber module having at least one predefined characteristic, said launch optical fiber module having a first end configured to receive illumination from said illumination module, and configured to return reflected illumination to said radiation detection module, and a second end configured to be connected to an optical fiber under test;
    whereby said respective first and second control modules and said analysis module cooperate to control at least a selected one of said illumination provided by said illumination module and a response of said radiation detection module, thereby automatically to determine an optical return loss of an optical fiber under test.

2. The apparatus according to claim 1, wherein control of said illumination provided by said illumination module comprises control of at least one of an illumination intensity, an illumination start time, and an illumination duration.

3. The apparatus according to claim 1, wherein said radiation detection module comprises an electromagnetic radiation detector having adjustable gain.

4. The apparatus according to claim 1, wherein said radiation detection module comprises an amplifier having adjustable gain.

5. The apparatus according to claim 1, wherein said launch optical fiber module having at least one predefined characteristic comprises a memory in which said at least one predefined characteristic is recorded.

6. The apparatus according to claim 5, wherein said analysis module is in communication with said memory of said launch optical fiber module having at least one predefined characteristic.

7. The apparatus according to claim 1, wherein said first control module and said second control module are a single control module.

8. A method of performing automated optical time domain reflectometry optical return loss measurements on an optical fiber under test, comprising the steps of:
    providing a launch optical fiber module having at least one predefined characteristic and having a first end and a second end;
    connecting said second end of said launch optical fiber module to a first end of an optical fiber under test, said optical fiber under test having a second end disposed at a length from said first end;
    illuminating said first end of said launch optical fiber module with applied illumination controllable in intensity with respect to time;
    detecting return illumination with a detector module having adjustable gain, said return illumination reflected by at least one of said launch optical fiber module and said optical fiber under test;
    in the event that a saturation condition of said detector module is detected, controlling at least one of said applied illumination and said gain of said detector module to eliminate said saturation condition;
    in the event that a suitable signal-to-noise ratio from said return illumination from said launch optical fiber module and said optical fiber under test is not attained, repeating the above steps of illuminating and detecting; and
    determining automatically from said return illumination and from said at least one of said predefined characteristic an optical return loss characteristic of said optical fiber under test.

9. The method according to claim 8, wherein said illumination controllable with respect to time comprises controlling at least one of an illumination intensity, an illumination start time, and an illumination duration.

10. The method according to claim 8, wherein detecting return illumination with a detector module having adjustable gain comprises detecting return illumination with an electromagnetic radiation detector having adjustable gain.

11. The method according to claim 8, wherein detecting return illumination with a detector module having adjustable gain comprises using an amplifier having adjustable gain.

12. The method according to claim 8, wherein providing a launch optical fiber module having at least one predefined characteristic comprises providing said launch optical fiber module including a memory in which said at least one predefined characteristic is recorded.

13. The method according to claim 8, wherein said signal-to-noise ratio is determined using an averaging method.

14. The method according to claim 8, further comprising the step of determining whether said second end of said launch optical fiber module and said first end of said optical fiber under test are connected.

15. A computer program recorded on a machine-readable medium, said computer program when operating on a general purpose computer directing and controlling the performance at least one of steps (c) through (g) hereinafter enumerated of an automated optical time domain reflectometry optical return loss measurement on an optical fiber under test, said measurement comprising the steps of:
   (a) providing a launch optical fiber module having at least one predefined characteristic and having a first end and a second end;
   (b) connecting said second end of said launch optical fiber module to a first end of an optical fiber under test, said optical fiber under test having a second end disposed at a length from said first end;
   (c) illuminating said first end of said launch optical fiber module with applied illumination controllable in intensity with respect to time;
   (d) detecting return illumination with a detector module having adjustable gain, said return illumination reflected by at least one of said launch optical fiber module and said optical fiber under test;
   (e) in the event that a saturation condition of said detector module is detected, controlling at least one of said applied illumination and said gain of said detector module to eliminate said saturation condition;
   (f) in the event that a suitable signal-to-noise ratio from said return illumination from said launch optical fiber module and said optical fiber under test is not attained, repeating the above steps of illuminating and detecting; and
   (g) determining automatically from said return illumination and from said at least one of said predefined characteristic an optical return loss characteristic of said optical fiber under test.

16. The computer program according to claim 15, wherein said illumination controllable with respect to time comprises controlling at least one of an illumination intensity, an illumination start time, and an illumination duration.

17. The computer program according to claim 15, wherein detecting return illumination with a detector module having adjustable gain comprises detecting return illumination with an electromagnetic radiation detector having adjustable gain.

18. The computer program according to claim 15, wherein detecting return illumination with a detector module having adjustable gain comprises using an amplifier having adjustable gain.

19. The computer program according to claim 15, wherein providing a launch optical fiber module having at least one predefined characteristic comprises providing said launch optical fiber module including a memory in which said at least one predefined characteristic is recorded.

20. The computer program according to claim 15, wherein said signal-to-noise ratio is determined using an averaging method.

21. The computer program according to claim 15, further comprising the step of determining whether said second end of said launch optical fiber module and said first end of said optical fiber under test are connected.

* * * * *